Aug. 23, 1932.   E. T. PEDRANTI   1,873,148
TUBE TESTER
Filed June 14, 1927
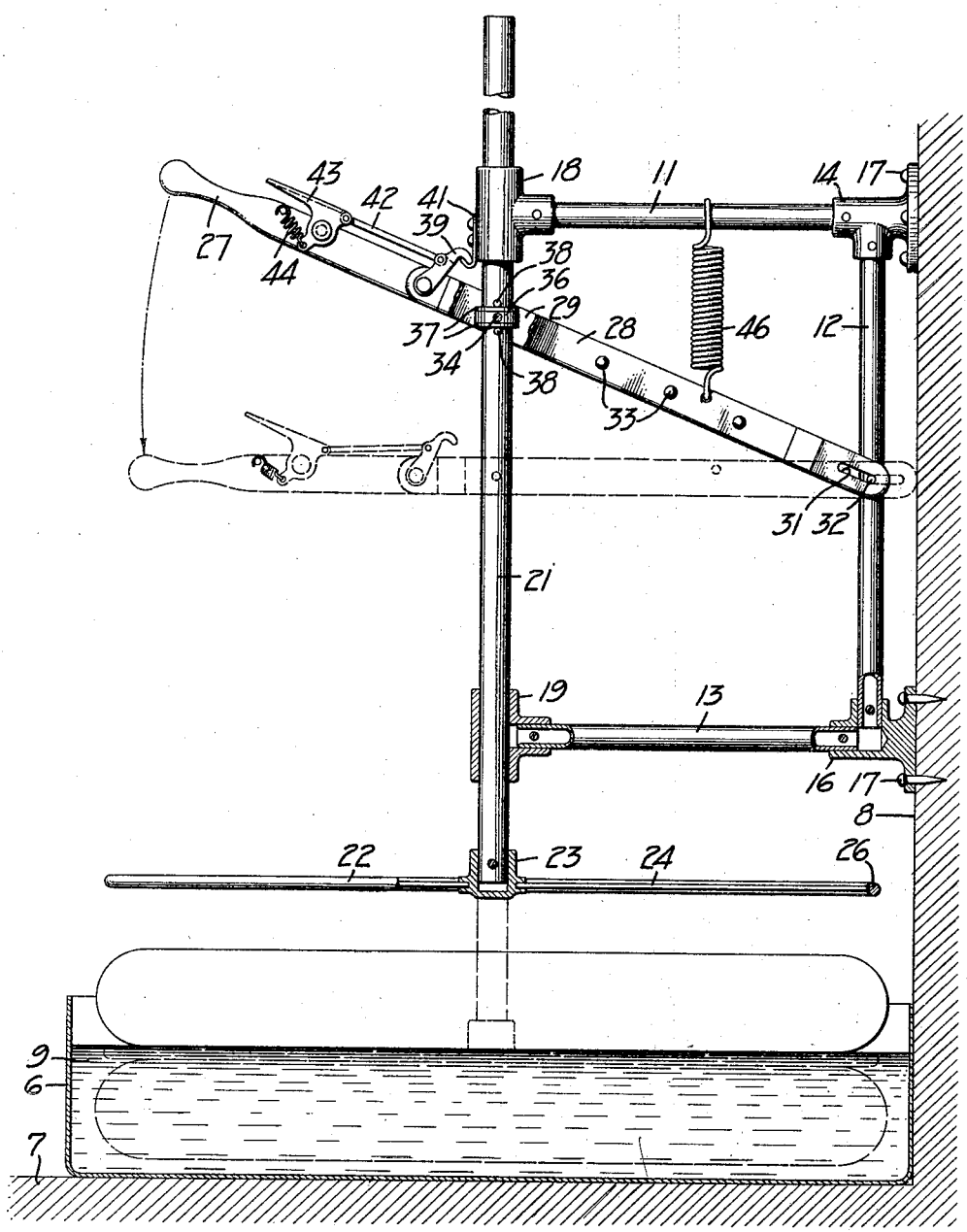
INVENTOR
Eugene T. Pedranti
BY
White, Prost & Fryer
ATTORNEYS Patented Aug. 23, 1932

1,873,148

UNITED STATES PATENT OFFICE

EUGENE T. PEDRANTI, OF PETALUMA, CALIFORNIA

TUBE TESTER

Application filed June 14, 1927. Serial No. 198,761.

My invention relates particularly to means for testing automobile tire inner tubes to determine whether or not they leak air.

It is the custom in testing automobile tire inner tubes to inflate them with air and submerge them in a tank of water for observation of any escaping air. If only a few tubes are to be tested they are immersed in a tank of water by hand. This becomes a tiresome and laborious process, however, if a large number of tubes must be handled or if the size of the tubes is great. It is advisable to have the entire tube submerged at once in order to make a thorough inspection thereof but this is well nigh impossible if the tube is large and correspondingly buoyant and the operator is not assisted either by a helper or by mechanical means. There have heretofore been provided various mechanical devices for submerging an inner tube in a tank of water in order to test it for air leaks, but they included complicated apparatus in which the tube had to be meticulously positioned and they required a large amount of time for adjustment and subsequent operation.

It is therefore an object of my invention to provide a mechanical tube tester in which no adjustments are necessary.

Another object of my invention is to provide a tube tester which can be rapidly operated.

Another object of my invention is to provide a tube tester in which the entire tube is uniformly submerged.

My invention possesses other advantageous features, some of which with the foregoing, will be set forth at length in the following description where I shall outline in full that form of the tube tester of my invention, which I have selected for illustration in the drawing accompanying and forming part of the present specification. In said drawing I have shown one form of tube tester embodying my invention, but it is to be understood that I do not limit myself to such form since the invention, as set forth in the claims may be embodied in a plurality of forms.

In the drawing:

The figure discloses in side elevation the tube tester of my invention, portions being broken away to disclose the internal construction thereof.

The tube tester of my invention preferably comprises a tank of water in which tubes are adapted to be immersed, provided with a plunger supported independently of the water tank for immersing the tubes.

I have shown in the drawing a preferred form of my invention in which a water tank 6 is supported on a table 7 at any convenient height. The tank preferably is of sheet metal of a suitable size to accommodate the ordinary automobile tire inner tubes and is preferably abutted against a wall 8. The tank is filled with water 9 to a convenient height to permit the complete immersion of the usual sizes of inner tubes.

Attached to the wall 8 I have provided means for immersing the inner tube in the tank. Preferably the immersing means is separately supported from the tank so that there is no interruption of the surface of the water in the tank. This permits a tube to be easily placed in the tank without any particular regard to the immersing means or its support and is the cause of a considerable saving in time.

To the supporting wall 8, I preferably affix a frame comprising metal pipes. The pipes 11 and 13 are preferably parallel and are fixed in brackets 14 and 16 secured to the wall by suitable lag screws 17. Disposed at right angles to pipes 11 and 13 and extending preferably parallel to the wall 8 is a bracing pipe 12, also suitably secured in the brackets 14 and 16. A sturdy frame is thus provided. The pipes 11 and 13 extend over the tank 6 and at their outer ends carry solidly affixed journals 18 and 19 in vertical alinement over the approximate center of the tank.

For immersing tubes in the tank, I preferably provide a member supported by the frame and adapted to be moved toward the water in the tank for depressing a tube floating thereon. This member may be of one or more parts or pieces variously associated and for convenience I term the member as a whole a "plunger". Comprised in the plunger is a rod 21 passing thru the journals 18 and 19. The rod is freely rotatable and freely slidable in the journals and at its lower end carries a wheel 22 also comprised in the plunger. The wheel can be any suitable abutment for immersing the tire tube in the water tank 6, but preferably is circular with a hub 23 mounted on the rod 21. From the hub, a plurality of spokes 24 radiate and, if desired, can be joined by a circular rim 26.

In order to move the wheel 22 toward and away from the tank 6, I have provided a manually operable lever 27 which is secured at one end to the pipe 12 and intermediate its ends is attached to the rod 21. The lever comprises a pair of straps 28 and 29 spaced apart at one end to provide a fork embracing the pipe 12. Each of the straps is apertured with a slot 31 cooperating with a pin 32 passing thru pipe 12 to constrain one end of the lever. For a considerable portion of their length the straps 28 and 29 are secured together by rivets 33 while they are again forked to surround the rod 21. Each of the straps 28 and 29 is engaged by short projecting lugs 34 on a collar 36 situated between a pair of spaced washers 37 positioned on the rod 21 by pins 38. The rod 21 and its associated wheel 22 are therefore free to rotate within the collar 36 but are constrained to axial movement with the lever 27.

A latch is provided for holding the wheel 22 normally at rest in upper position out of the tank 6. The latch comprises a hook 39 pivoted to the strap 28 and cooperating with a similar hook 41 affixed to the journal 18. A rod 42 connects hook 39 with a movable grip 43 pivoted adjacent the handle of the lever 27. A spring 44 ordinarily maintains the hook 39 in engagement with the hook 41.

In the operation of my tube tester, a tube to be tested is placed in the tank of water 6 and floats on the surface of the water due to its contained air. The lever 27 is released by operation of grip 43 and is manually depressed to translate rod 21 toward the tank of water. Wheel 22 thereby comes into contact with the tube and immerses it uniformly and completely below the surface of the water in the tank 6. The buoyant tube is maitnained in submerged position by a slight pressure exerted manually on the lever 27. At the same time, wheel 22 is preferably slowly rotated by hand to bring all portions of the immersed tube convenient to the inspection of the operator. When the inspection of the tube has been finished, the lever 27 is released and is returned by a coil spring 46 to its normal position with hook 39 engaging hook 41. The tested tube can then be easily withdrawn from the water tank 6 which is then ready for further operations.

I claim:

1. A tube tester for operating upon an inflatable inner tube for an automobile tire comprising a tank for containing water, a support outside the boundary of said tank, a plunger on said support and adapted to descend upon an inner tube floating on water in said tank, and means for operating said plunger positively to contact the upper surface of said tube only to depress said inner tube into said water.

2. A tube tester for operating upon a buoyant body comprising a tank for containing water, a support at one side of the tank and extending thereover, and a plunger on said support adapted to descend upon said body when said body is supernatant on said water and submerge said body by contact with only the upper surface thereof.

3. A tube tester comprising a tank for containing water, a support outside of the boundary of said tank, a plunger mounted on said support and overlying said tank, and means for depressing said plunger into contact with the upper surface only of a body supernatant on said water whereby said body is submerged by said plunger.

4. A tube tester comprising a tank for containing water upon which an annular, buoyant body can float, a support beyond the outer periphery of said body, a plunger mounted on said support to overlie said annular body, and means for lowering said plunger into said tank and into contact with the upper surface only of said body whereby said buoyant body is submerged in said water.

In testimony whereof I have hereunto set my hand.

EUGENE T. PEDRANTI.